May 6, 1941.   C. F. JENKINS   2,240,652
DYNAMOELECTRIC MACHINE WITH DISTORTED FIELD FLUX
Filed Aug. 18, 1939
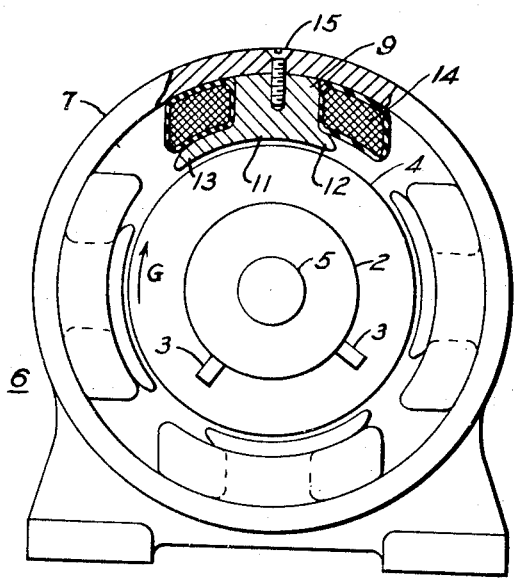
WITNESSES:
INVENTOR
Charles F. Jenkins.
BY
ATTORNEY Patented May 6, 1941

2,240,652

UNITED STATES PATENT OFFICE 2,240,652

DYNAMOELECTRIC MACHINE WITH DISTORTED FIELD FLUX

Charles F. Jenkins, Forest Hills, Pa., assignor to Westinghouse Electric & Manufacturing Company, East Pittsburgh, Pa., a corporation of Pennsylvania Application August 18, 1939, Serial No. 290,781

1 Claim. (Cl. 171—252)

My invention relates to improvements in the pole-tip construction of dynamoelectric machines having distorted field-flux, and it has particular relation to direct-current machines or other commutator-type machines having a salient-pole field-structure in which the flux is crowded to one side of the respective field-poles by armature-reaction.

My invention has more particular reference to the mitigation of that type of internal loss which is generally known as a distortion loss in a dynamoelectric machine, particularly in a machine, either motor or generator, for a location in which weight is at a considerable premium, so that the size of the machine must be kept down to an absolute minimum, as on aircraft. The distortion losses in dynamoelectric machines result from the armature-reaction which causes a magnetization in quadrature with the main field-flux, thus causing a decrease in the flux passing through one of the tips of each main pole, and an increase in the flux passing through the other tip. In an ordinary design, this increase in flux at one of the pole-tips more or less saturates the high-flux tip, thus reducing the permeability of that tip, which is a portion of the field-structure iron of the motor. Because of this saturation, the field-iron can carry a slightly less flux than if no saturation were present, so that the total flux, and hence the total power, of the dynamoelectric machine is somewhat decreased because of the saturation. This decrease could obviously be overcome by adding more weight, either in iron, or in exciting copper, or both, but my invention relates to an application in which it is not desirable to add that additional weight.

Heretofore, various means have been proposed for preventing the field-flux from crowding into one side of each of the main pole-pieces, but these means have been themselves sources of additional weight.

According to my present invention, I let the field-flux crowd over into one side of the shank-portion of the respective field-poles, because there is sufficient cross-section available in these shank-portions to stand a certain amount of flux-crowding without any material saturation, or reduction in permeability. In accordance with my invention, however, I alter the pole-tip structure. The pole-tips are needed in order to make the salient pole-pieces terminate in large pole-faces, opposite to the rotor or armature member, whereas the shanks of the pole-pieces must be of somewhat smaller size, so as to accommodate the field-coils which are placed on the shanks. Thus, the flux in the shank must spread out in the pole-face portions, including the leading and trailing tips, so as to be presented to the air-gap of the machine over a surface which is wider circumferentially than the circumferential width of the shank-portions of the pole-pieces. In accordance with my invention, I make the pole-tip on the crowded-flux side of each pole-piece smaller, or shorter circumferentially, than the the other pole-tip, so as to avoid saturation at the portion where the crowded-flux pole-tip joints onto the shank of the pole-piece.

In the usual and preferred form of embodiment of my invention, it is utilized in a machine in which, to conserve the weight, the design is such that the field-coils fit tightly on the pole-shanks, and in which the pole-tips are integral extensions of the pole-shanks, so that, in order to assemble the structure, it is necessary to detachably connect the shanks to the yoke-portion of the field-structure.

With the foregoing and other objects in view, my invention consists in the structures, parts, combinations and methods hereinafter described and claimed, and illustrated in the accompanying drawing, the single figure of which is a somewhat diagrammatic end-view of a dynamoelectric machine embodying my invention, with parts broken away to illustrate the structure.

The illustrated machine is a commutator machine which may be either for direct-current or alternating-current and either a generator or a motor. For convenience in discussion, I shall refer to the machine as a direct-current generator, with the understanding that my invention is not necessarily limited to a direct-current generator.

The illustrated machine comprises a commutator which includes a cylindrical current-collective device 2 and brushes 3, and an armature 4, mounted on a shaft 5, and a field-structure or stator-member 6. The field-structure 6 comprises a magnetizable yoke-member 7 and a plurality of salient pole-structures, each salient pole-structure comprising a magnetizable shank-portion 9, which merges into a pole-face portion 11 which spreads out into a short tip 12 at the side where the flux is crowded by reason of armature reaction, and a long tip 13 at the other end.

The shank 9 is encircled by a field-coil 14 which is preferably of the pre-formed design, having a size which adapts it to fit snugly over the shank-portion 9, so that the coil 14 is held between the yoke 7 and the two tips 12 and 13, this structure being repeated for each of the poles of the machine. In order to make it possible to assemble the structure, the salient pole-pieces 9—11—12—13 are made separate from the yoke-portion 7, being detachably secured thereto by any suitable means such as screws 15. It will be understood that the magnetizable portions of the field-structure are made of iron or other magnetizable material which is subject to saturation-effects.

My machine is a single-direction machine, that is, one which is designed to rotate in but a single direction. For a generator, the direction of rotation is as indicated by the arrow marked G, such that the armature-reaction tends to crowd the field-flux into the short pole-tips 12 of the respective pole-pieces 9—11. In the case of a motor, the direction of rotation would be the reverse of that indicated by the arrow G, so that the armature-reaction would still tend to crowd the field-flux into the short pole-tips 12.

The long pole-tips 13 are elongated (in a circumferential direction) by substantially the same amount that the short pole-tips 12 are shortened, as compared to a normal design in which the two pole-tips are symmetrical with respect to the center-line of the pole, so that the overall surface of the pole-face 11, in my design, has substantially the same area as if my invention had not been utilized, while the non-symmetrical arrangement of the tips 12 and 13 results in reducing the reluctance to the flow of the magnetic flux through the magnetizable iron structure of the field-member of the machine, by reducing the circumferential distance that the crowded flux has to the flow in the crowded-flux tip 12, while increasing the circumferential distance that the smaller amount of flux has to flow in the weakened-field tip 13, these results being brought about by the differences in the circumferential lengths or extents of the respective tips 12 and 13.

It will be understood, of course, that the operation which has been described in connection with one pole-piece is true of all of the pole-pieces of the machine, either main poles or interpoles, although my invention has its most usual application to machines, as illustrated, which have no interpoles. My invention is also the most needed in machines of the type having a strong armature-reactance and a weak field, as will be understood by designers of dynamoelectric machines, although here again, my invention is obviously not limited to such machines.

To the best of my knowledge, this is a novel structure and a novel combination which has never heretofore been disclosed in dynamoelectric machines of the types described.

I claim as my invention:

A dynamoelectric machine having an armature, and a salient-pole field-structure of a type in which the flux is crowded to one side of the respective field-poles by armature-reaction, said field-structure having a flux-saving, efficiency-increasing construction characterized by each salient field-pole terminating in a pole-face portion which is displaced to one side of the shank-portion so as to provide a long tip on the weakened-flux side whereby saturation-effects are minimized under the operating-conditions tending to produce the most saturation, each pole-piece having a shank-portion which is substantially integral in a circumferential direction, from side to side of the shank-portion, and a separate field-coil means sufficiently tightly embracing the shank-portion of each pole-piece so that each field-coil means is irremovably retained in position by the pole-tip portion so long as the field-poles with their tips are in their fully assembled positions within said field-structure.

CHARLES F. JENKINS.